United States Patent Office 3,347,822
Patented Oct. 17, 1967

3,347,822
FLAMEPROOFED SYNTHETIC RESINS
Herbert Jenkner, Cologne-Bruck, Germany, assignor to Chemische Fabrik Kalk G.m.b.H., Cologne-Kalk, Germany
No Drawing. Filed Oct. 28, 1963, Ser. No. 319,544
Claims priority, application Germany, Nov. 12, 1962, C 28,388
4 Claims. (Cl. 260—45.75)

The present invention relates to improved flameproofed synthetic resin compositions and more particularly to such compositions containing highly brominated mixtures of diphenyl and diphenyl ether as flame retarding agents.

The combustibility of synthetic resins, such as, for example, polyolefins, polystyrene, polyesters, polyurethanes, epoxy resins, synthetic rubber and the like, as is known, can be substantially reduced by the incorporation therein of halogen derivatives of organic compounds. For example, chloroparaffins, hexahalobenzenes, pentabromodiphenyl or pentabromodiphenyl ether or octabromodiphenyl are especially suited for this purpose. In most instances the effectiveness of such halogen derivatives can be increased still further by the additional incorporation of suited inorganic compounds, such as, for example, antimony trioxide, in the resins to be rendered flame resistant.

The addition of chloroparaffins and antimony trioxide to synthetic resins and especially to polyethylene, however, also engenders certain technical disadvantages, as in the further processing of such resins which have been rendered flame resistant in this manner temperatures must be employed at which the choloroparaffins in the presence of antimony trioxide liberate HCl. This not only reduces the high flame resistance which was intended to be achieved but also considerably increases the corrosion of the apparatus used in such processing. As can be seen therefrom, the chloroparaffins incorporated in the combustible synthetic resins in combination with antimony trioxide liberate HCl already at temperatures which lies at the lower limit of flame temperatures. As a consequence, when a synthetic resin containing chloroparaffin and antimony trioxide is heated at one location for only a short period of time to temperatures which are only a little above the ignition temperature of such synthetic resin, the quantity of HCl or chlorine set free suffices to interrupt the combustion of the cracked products set free from the synthetic resin, which combustion proceeds as a chain reaction in the gas phase. However, if a larger area of a chloroparaffin and antimony trioxide containing synthetic resin is heated to a temperature considerably above the ignition temperature of the resin by contact with flames over a longer period of time, the chlorine contained in the resin is liberated very quickly but does not suffice to prevent continued burning of the resin after the end of a longer period of contact with flames.

It has already been recommended to add substances such as thiourea which reduce the decomposition of chloroparaffin to reduce the decomposition of chloroparaffin in synthetic resins during their processing. However, the desired reduction in decomposition achieved during the processing of the resin also occurs when such resin is subjected to flame action and consequently the flameproofing action of the chloroparaffin is reduced.

Hexahalobenzenes have the advantage over the chloroparaffins that they are thermally more stable and only liberate chlorine at temperatures above those at which chlorine is liberated from the chloroparaffins. However, the hexahalobenzenes sweat out from the resins in a short time and in large quantities so that no lasting flame resistance can be effected in the resins therewith. Pentabromodipheny and antimony trioxide can easily be in combination with antimony trioxide for flameproofing low pressure polyethylene can only be worked into high pressure polyethylene with great difficulty and furthermore sweats out in a very short period of time.

As a consequence, it has been proposed to employ octabromodiphenyl in combination with antimony trioxide for flameproofing polyethylene. A mixture of octabromodiphenyl and antimony trioxide can easily be worked into synthetic resins, such as, high or low pressure polyethylene, and imparts lasting flame resistance to such synthetic resins as the octabromodiphenyl practically does not sweat out. Octabromodiphenyl only has the disadvantage that its production is costly technically. According to a recent process it is produced by reacting bromine with diphenyl at temperatures over 200° C. in sulfuric acid which in order to effect oxidation of the hydrogen bromide produced as a by-product must contain large quantities of sulfur trioxide. The processing of the reaction mixture after completion of the bromination and purification of the octabromodiphenyl recovered requires costly technical measures.

Consequently, there was a desire for a flameproofing agent for synthetic resins which could be produced technically in a simple manner and at the same time possess the same advantageous properties as octabromodiphenyl.

According to the invention it was found that a flameproofing agent for synthetic resins, particularly, polyolefins, polystyrene and its copoplymers with unsaturated polyesters, polyesters, polymethacrylates, polyacrylates, epoxy resins, synthetic rubber, polyurethanes, meeting these requirements was provided by a product resulting from the bromination of a mixture of 90 to 10% by weight of diphenyl and 10 to 90% by weight of diphenyl ether having a bromine content (bound) between 50 and 85%, preferably, between 70 and 85% by weight. The quantity of such brominated mixture employed is such as to provide 3% to 20% by weight, preferably, 5% to 15% by weight, of bromine with reference to the quantity of synthetic resin. If desired, such brominated mixtures can be used in combination with other flame retarding substances.

As indicated, a mixture of 10 to 90% by weight of diphenyl and 90 to 10% by weight of diphenyl ether can be used as the starting material for the production of the brominated product. Advantageously, however, an azeotropic mixture of such compounds containing 26.5% by weight of diphenyl and 73.5% by weight of diphenyl ether is employed. In the following the mixtures of diphenyl and diphenyl ether will be designated as "diphenether" for sake of simplicity.

The bromination of the diphenether to a product containing 50 to 85% and preferably 70 to 85% by weight of bromine, hereinafter designated as "bromdiphenether" is possible in a technically simple manner. Advantageously, the bromination of the diphenether is carried out in an inert solvent, such as, carbon tetrachloride, chloroform, bromoform, dichlorodibromomethane and, especially, ethylene bromide.

In addition, small amounts of usual halogenation catalysts, such as, iron, aluminum or halides of such metals and iodine or mixtures thereof, must be added to the reaction mixture of the diphenether and the solvent. The quantity of such catalyst depends on the type and manner in which the bromination of the diphenether is to be carried out and can easily be determined from case to case by simple preliminary tests. The addition of the quantity of catalyst required can be all at once before initiation of the bromination or portionwise during the progress of the bromination. It also can be expedient to add small quantities of water to the reaction mixture. Such quantity of water, however, should not be greater in weight than the quantity of halogenation catalyst added.

In order that the bromine introduced into the reaction mixture is practically completely utilized in the formation of the bromdiphenether, the by-product hydrogen bromide produced during the bromination must be reoxidized to free bromine. For this purpose, it has proved especially advantageous to add to the reaction mixture a quantity of chlorine which is at least equivalent to the hydrogen bromide produced. In addition to having an oxidizing action, the chlorine accelerates the course of the bromination, evidently by forming chlorine-bromine compounds.

The bromination of the diphenether to the desired bromdiphenether proceeds with adequate speed at temperatures up to 80° C. Maintenance of such low temperatures also hinders the progress of undesired side reactions.

After the bromination is ended the excess of bromine which may still be contained in the reaction mixture must be removed. For this purpose reducing agents, such as, for example, sodium bisulfite or formic acid, can be added in equivalent quantities. More advantageously, however, the excess bromine can be removed from the reaction mixture by the introduction of olefins, especially, ethylene, into the reaction mixture to form the corresponding brominated product, such as, for example, ethylene bromide.

After the excess bromine has been removed the reaction mixture is washed, dried and filtered. A combination of a climbing film evaporator and a spray evaporator has been found particularly suited for processing the filtrate in that the filtrate is first drawn through a climbing film evaporator with the aid of a vacuum and then passed through two spray evaporators also under vacuum. The bromdiphenether collects as a highly viscous liquid or as a crystalline product in the receiver, whereas the solvent is frozen out or condensed in an intensive cooler. The bromdiphenether is obtained as a crystalline product when it contains more than 75% by weight of bromine. With a bromine content below 75% by weight the bromdiphenether is a highly viscous liquid.

When chlorine is employed to oxidize the by-product hydrogen bromide produced during the bromination, the end product may also contain 0.1 to 5.0% by weight of bound chlorine. This chlorine content does not impair the flame retarding action of the bromdiphenether.

While the aforementioned process can advantageously be employed for the production of the bromdiphenether products employed as flame retarding agents according to the invention, fundamentally every bromdiphenether, regardless of its mode of production, can be employed as the flame retarding agents according to the invention provided, of course, that they exhibit the necessary bromine content.

In order to render synthetic resins, such as, for example, high or low pressure polyethylene, polypropylene, polystyrene, unsaturated polyester-styrene copolymers, polyesters, polymethacrylates, polyacrylates, epoxy resins, synthetic rubber, polyurethanes and the like, flame resistant, sufficient quantities of bromdiphenether are incorporated therein, if desired, in combination with other flame retarding agents, that the content of bromine therein with reference to the synthetic resin is between 3 and 20%, preferably, 5 and 15%, by weight. In rendering polyolefins, especially, polyethylene, flame resistant, it is advantageous to incorporate 3 to 15% by weight of antimony trioxide in addition to such bromdiphenether. With various synthetic resins, such as, polystyrene, unsaturated polyester-styrene copolymers, polyesters, polymethacrylates, polyacrylates, epoxy resins, synthetic rubber, polyurethanes and the like, the bromdiphenether, if desired, in conjunction with other flame retarding agents, is advantageously added to the monomer or monomer mixture before the polymerization. The addition of the bromdiphenether to polyolefins, especially, polyethylene and polypropylene, can also be effected during their production. Advantageously, however, the bromdiphenether and the antimony trioxide are worked in during the rolling, calendering or extrusion of the polymers. No liberation of hydrogen bromide or bromine occurs even though such working in is effected at higher temperatures. For good flame resistance, it is essential that the bromdiphenether and, if desired, the other flame retarding agents, such as, antimony trioxide, is completely distributed homogeneously in the synthetic resin. The possible chlorine content of 0.1 to 5.0% by weight in the bromdiphenether does not produce any deleterious effects when the bromdiphenether is worked into the resin. Regardless of the manner in which the bromdiphenether is incorporated into the synthetic resin, it is easily distributed therein without difficulty.

It is self understood that other substances adapted in combination with the bromdiphenether for the reduction of the combustibility of the synthetic resin concerned can be employed in addition to the bromdiphenether and also to the antimony trioxide, when employed. Such substances, for example, are esters of acids of phosphorus. Such phosphorus containing esters have proved particularly effective in combination with bromdiphenether in rendering unsaturated polyesters, polyurethanes, polymethylmethacrylates and the like flame resistant.

The incorporation of the bromdiphenether has practically no deleterious effect upon the mechanical properties of the synthetic resin concerned. The bromdiphenether also exhibits no tendency to migrate so that it provides lasting flame resistance to synthetic resins and especially high and low pressure polyethylene into which it has been worked in. In addition, the highly effective flame retarding agent, bromdiphenether, can be produced in a simple course of manufacture.

The synthetic resins which have been rendered flame resistant according to the invention, even after being subjected to flame for a long period of time, will extinguish immediately after removal of the flame. The material which in some instances drops off while the resin is subjected to the action of the flames extinguishes immediately after it leaves the zone of such flames.

The bromdiphenether employed according to the invention therefore meets all of the technical requirements for a flame retarding substance for synthetic resins in an advantageous manner.

The following example will serve to illustrate the present invention. In such example the proportions are given in parts or percent by weight unless otherwise specified.

*Example*

274 parts of a mixture of 73% of diphenyl ether and 26.5% of diphenyl were dissolved in 550 parts of ethylene bromide and 1120 parts of bromine and 410 parts of chlorine were introduced into such solution at 60° C. in such a way that a slight excess of bromine over chlorine was always maintained in the reaction mixture. In addition, during the introduction of the halogens a total of 0.4 part of iron powder and 0.2 part of water were added portionwise to the reaction mixture.

After completion of the bromination the excess free bromine contained in the reaction mixture was bound in the form of ethylene bromide by the introduction of ethylene. Thereupon, after washing with water until acid free, drying and filtering the reaction mixture, the bromdiphenether was separated therefrom with the aid of a combination of a climbing film evaporator and a spray evaporator maintained at 150 to 200° C. and a pressure of 0.1–10 mm. Hg. 1170 parts of crystalline bromdiphenether (91% of theory) with a bromine content of 76.4% and a chlorine content of 1.2% were obtained.

100 parts of a high pressure polyethylene of a density of 0.918 were mixed on a roll mill at 120° C. with 10 parts of the bromdiphenether thus produced and 5 parts of antimony trioxide. The rolled sheet which was pulled off which contained 6.6% of bromine and 0.105% of chlorine as well as 4.35% of antimony trioxide was molded to plates 3 mm. thick. These plates were then stored for 1 month at 25–50° C. After such storage no loss in weight and no formation of a coating on such plates could be found.

The behavior of such plates when contacted with flames was investigated according to ASTM specification 1692. In the tests employed in such investigation samples 6 inches long and 2 inches wide were sawed from the plates. A netting of 40 gauge steel wire 8½ inches long and 3 inches wide which had a ½ inch length bent up at a 90° angle at one of its narrow sides was used as a support for these samples during the tests. Such wire netting was held at one corner of the bent up section of one of the narrow sides and in the middle of the opposed other narrow side by two clamps. The sample being tested was laid on the wire netting so that a narrow side thereof contacted the bent up portion of the netting so that it rested in the middle of the wire netting. A Bunsen burner provided with a broad slit nozzle 1⅓ inches broad was placed under the bent up narrow end of the wire netting so that the distance between the upper end of the nozzle and the wire netting was ½ inch. The flame of the burner was non-luminous and had a height of 1½ inches. The samples tested were subjected to the flame for 1 minute and the time required for any flame from the sample to extinguish after removal of the Bunsen burner flame ascertained. In each instance the time required for the flame from the samples tested to extinguish after removal of the Bunsen flame was less than 1 second.

I claim:

1. A flame resistant synthetic resin composition comprising a polyolefin and a quantity of a bromination product of a mixture of 10 to 90% by weight of diphenyl and 90 to 10% by weight of diphenyl ether having a bromine content of 50 to 85% by weight sufficient to provide a bromine content of 3 to 20% by weight with reference to the polyolefin uniformly distributed in said polyolefins.

2. A flame resistant synthetic resin composition comprising a polyolefin and a quantity of a bromination product of a mixture of 10 to 90% by weight of diphenyl and 90 to 10% by weight of diphenyl ether having a bromine content of 75 to 85% by weight sufficient to provide a bromine content of 5 to 15% by weight with reference to the polyolefin uniformly distributed in said polyolefins.

3. A synthetic resin composition according to claim 2 comprising in addition 3–15% by weight of antimony trioxide uniformly distributed in said polyolefin.

4. A flame resistant polyethylene resin composition comprising polyethylene and a quantity of a bromination product of a mixture of 10 to 90% by weight of diphenyl and 90 to 10% by weight of diphenyl ether having a bromine content of 75 to 85% by weight sufficient to provide a bromine content of 5 to 15% by weight with reference to the polyethylene and 3 to 15% by weight of antimony trioxide uniformly distributed in said polyethylene.

References Cited
UNITED STATES PATENTS

| | | | |
|---|---|---|---|
| 2,967,164 | 1/1961 | Aries | 260—33.8 |
| 3,075,944 | 1/1963 | Wick et al. | 260—45.7 |
| 3,133,038 | 5/1964 | Hahn | 260—41 |

DONALD E. CZAJA, *Primary Examiner.*

LEON J. BERCOVITZ, *Examiner.*

M. J. WELSH, *Assistant Examiner.*